US011923614B2

(12) United States Patent
Yang et al.

(10) Patent No.: US 11,923,614 B2
(45) Date of Patent: Mar. 5, 2024

(54) ANTENNA ROTATION STRUCTURE AND ELECTRONIC DEVICE

(71) Applicant: Wistron NeWeb Corporation, Hsinchu (TW)

(72) Inventors: Chih-Feng Yang, Hsinchu (TW); Chao-Chun Lin, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 0 days.

(21) Appl. No.: 18/145,905

(22) Filed: Dec. 23, 2022

(65) Prior Publication Data

US 2024/0047867 A1 Feb. 8, 2024

(30) Foreign Application Priority Data

Aug. 8, 2022 (TW) ................................ 111129777

(51) Int. Cl.
*H01Q 3/06* (2006.01)

(52) U.S. Cl.
CPC .................................... *H01Q 3/06* (2013.01)

(58) Field of Classification Search
CPC ............................ H01Q 3/02–06; H01Q 1/12
See application file for complete search history.

(56) References Cited

U.S. PATENT DOCUMENTS 10,923,794 B2 * 2/2021 Jang .................... H01Q 1/1228
2016/0276746 A1 * 9/2016 Mielke .................. H01Q 1/125
2018/0351248 A1 * 12/2018 Kim ........................ H01Q 1/08

* cited by examiner

*Primary Examiner* — Hasan Islam
*Assistant Examiner* — Aladdin Abdulbaki
(74) *Attorney, Agent, or Firm* — McClure, Qualey & Rodack, LLP

(57) ABSTRACT

Antenna rotation structure includes a rotating member and an angle adjusting member. The rotating member is rotatably disposed along an axial direction in an accommodating space of the housing and includes a holding portion and a pushing portion disposed at one side of the holding portion spaced apart from the axial direction. The angle adjusting member includes a pressing portion bonded to a through hole of the housing and made of an elastic material and, an abutting portion connected to the pressing portion and corresponding to the pushing portion. When the pressing portion is pressed by a force, it deforms and drives the abutting portion to push the pushing portion to drive the holding portion to rotate about the axial direction to adjust the angle of the antenna.

17 Claims, 7 Drawing Sheets

ANTENNA ROTATION STRUCTURE AND ELECTRONIC DEVICE

CROSS-REFERENCE TO RELATED PATENT APPLICATION

This application claims the benefit of priority to Taiwan Patent Application No. 111129777, filed on Aug. 8, 2022. The entire content of the above identified application is incorporated herein by reference.

BACKGROUND

Technical Field

The present disclosure relates to an antenna rotation structure and an electronic device, and more particularly, to a push or press type antenna rotation structure and an electronic device.

Description of Related Art

Because 5G millimeter waves have low coverage, signals are more likely to be blocked due to topography during implementation, and so to maintain the signal strength of a communication device in normal operation, the angle of the antenna is adjusted according to the topography environment.

However, antenna angle adjustment mechanism in conventional electronic devices is usually a fixed structure that secures the antenna in place, and when adjusting the antenna angle, the antenna is first removed from the fixed structure before adjusting the orientation of the fixed structure to adjust the angle, and after the fixed structure is adjusted to the desired angle, the antenna is put back into the fixed structure and in turn placed at the desired antenna angle. Therefore, the conventional antenna angle adjustment mechanism requires multiple components, like gears, racks, springs, and combination thereof to achieve angle adjustment.

In view of this, the development of an antenna rotation structure and an electronic device that use less components and has simplified mechanism is in dire need for the related industry.

SUMMARY

In one aspect, the present disclosure provides an antenna rotation structure configured to adjust an angle of an antenna from outside of a housing. The housing has an accommodating space and a through hole. The antenna rotation structure includes a rotating member and an angle adjusting member. The rotating member is rotatably disposed along an axial direction in the accommodating space and includes a holding portion and a pushing portion. The pushing portion is disposed on one side of the holding portion, and there is an interval between the pushing portion and the axial direction. The angle adjusting member includes a pressing portion and an abutting portion. The pressing portion is bonded to the through hole of the housing and is made of an elastic material. The abutting portion is connected to the pressing portion and corresponds to the pushing portion. When the pressing portion is pressed by a force, the pressing portion deforms and drives the abutting portion to push the pushing portion, such that the pushing portion drives the holding portion to rotate about the axial direction so as to adjust the angle of the antenna.

In another aspect, the present disclosure provides an electronic device that includes a housing, an antenna rotation structure, and an antenna. The housing includes an accommodating space and a through hole. The antenna rotation structure includes a rotating member and an angle adjusting member. The rotating member is rotatably disposed along an axial direction in the accommodating space and includes a holding portion and a pushing portion. The pushing portion is disposed on one side of the holding portion and there is an interval between the pushing portion and the axial direction. The angle adjusting member includes a pressing portion and an abutting portion. The pressing portion is bonded to the through hole of the housing and is made of an elastic material. The abutting portion is connected to the pressing portion and corresponds to the pushing portion. The antenna is disposed on the holding portion. When the pressing portion is pressed by a force, the pressing portion deforms and drives the abutting portion to push the pushing portion, such that the pushing portion drives the holding portion to rotate about the axial direction so as to adjust an angle of the antenna.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
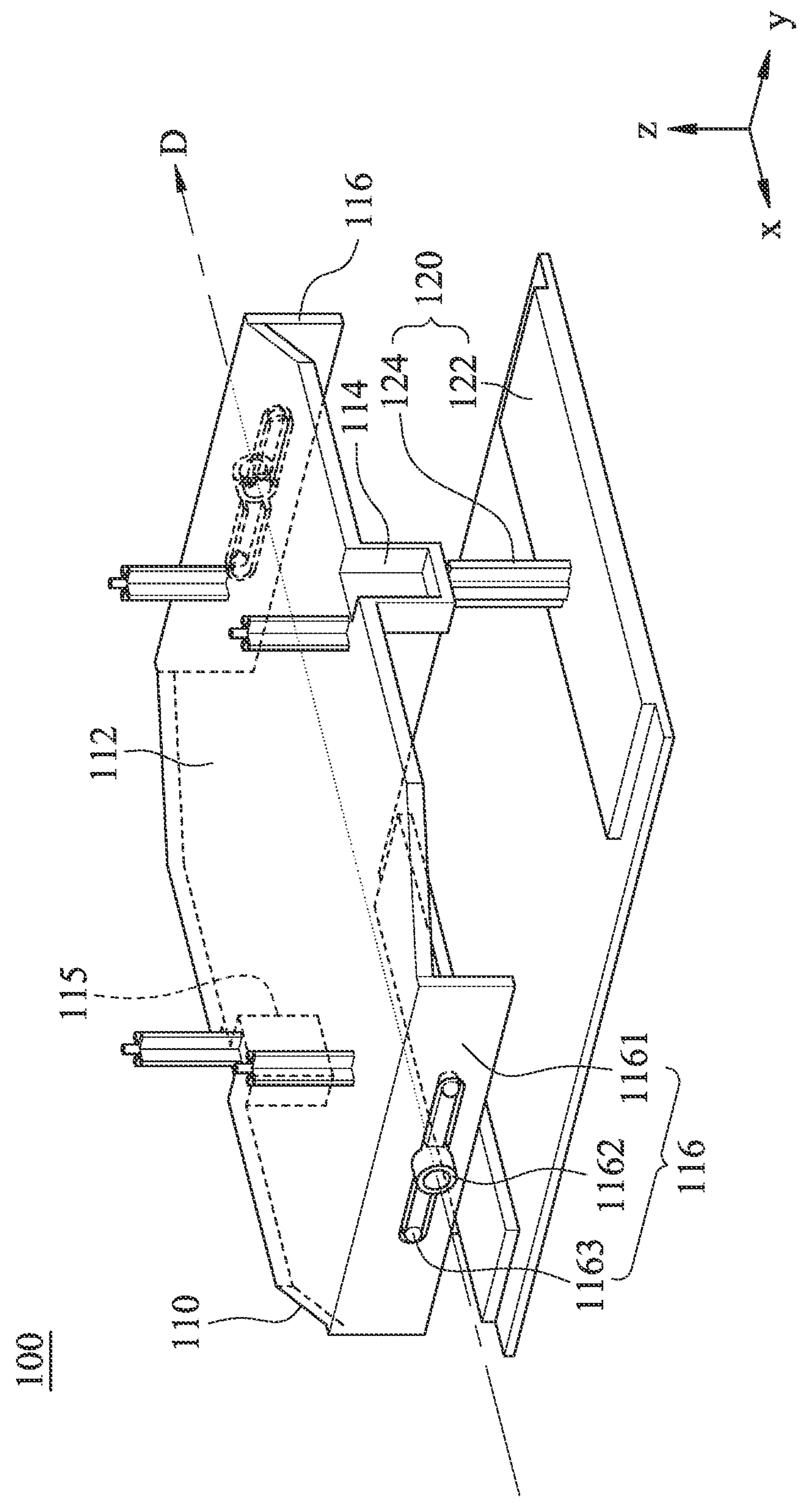
FIG. 1 is a schematic view of an antenna rotation structure according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as “first”, “second” or “third” can be used to describe various components, signals or the like, which are for distinguishing one component/signal from another one only, and are not intended to, nor should be construed to impose any substantive limitations on the components, signals or the like.

Figure 2:
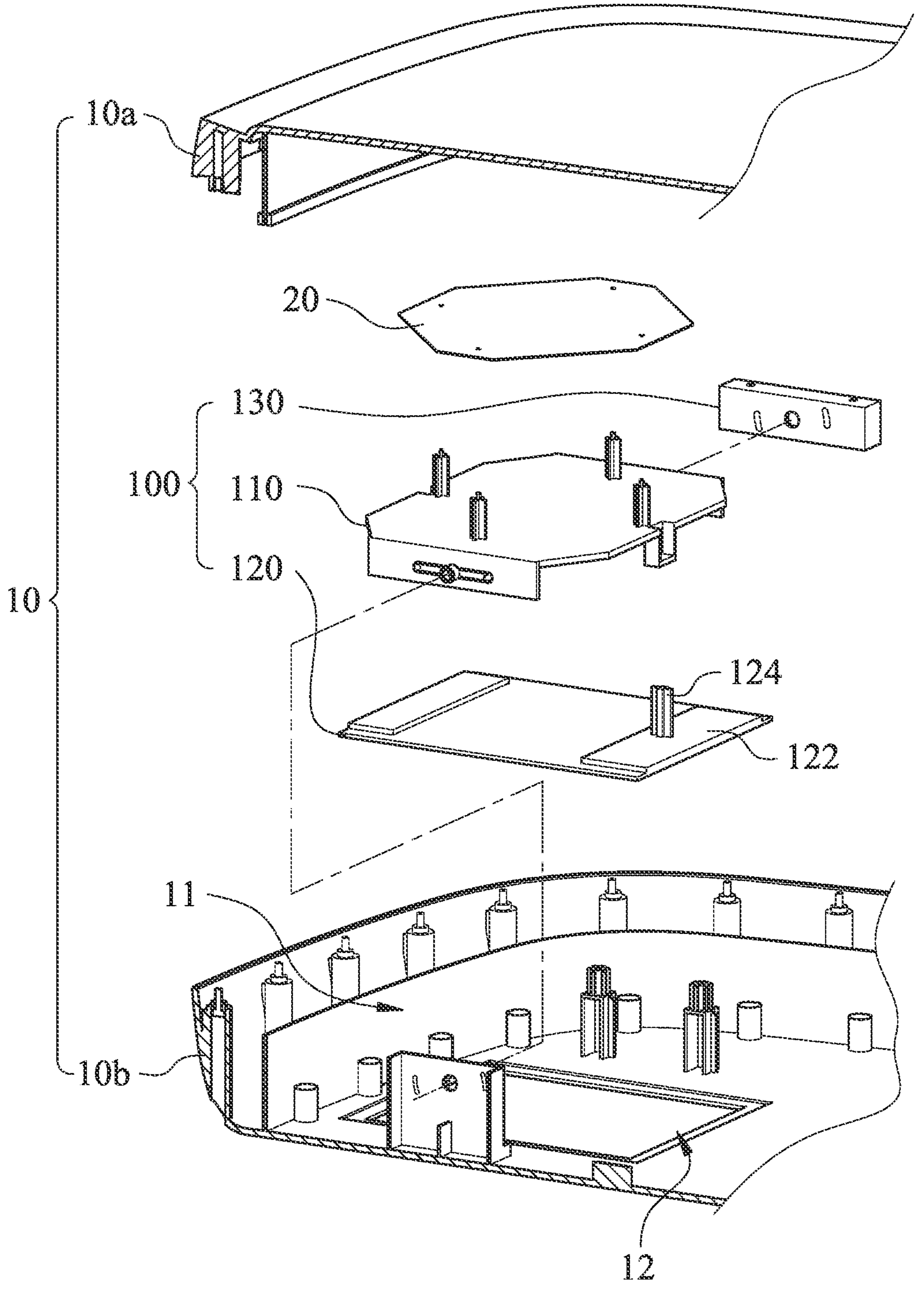
FIG. 2 is an exploded view of the antenna rotating structure of FIG. 1 disposed in a housing.

Referring to FIG. 1 and FIG. 2. FIG. 1 is a schematic view of an antenna rotation structure 100 according to a first embodiment of the present disclosure. FIG. 2 is an exploded view of the antenna rotating structure 100 of FIG. 1 disposed in a housing. The antenna rotation structure 100 according to a first embodiment is configured to adjust an angle of an antenna 20 from the outside of a housing 10. The housing 10 includes an accommodating space 11 and a through hole 12. The antenna rotation structure 100 includes a rotating member 110 and an angle adjusting member 120. The rotating member 110 is rotatably disposed along an axial direction (direction x) in the accommodating space 11 and includes a holding portion 112 and a pushing portion 114. The pushing portion 114 is disposed on one side of the holding portion 112 and spaced apart from the axial direction D, in other words, there is an interval between the axial direction D and the pushing portion 114. The angle adjusting member 120 includes a pressing portion 122 and an abutting portion 124. The pressing portion 122 is bonded or closely fitted to the through hole 12 of the housing 10 and is made of an elastic material. The abutting portion 124 is connected to the pressing portion 122 and corresponds to the pushing portion 114. When the pressing portion 122 is pressed by a force F1 (shown in FIG. 4), it deforms and drives the abutting portion 124 to push the pushing portion 114 so that the pushing portion 114 drives the holding portion 112 to rotate about the axial direction D, and therefore the angle of the antenna 20 is adjusted. Thus, by configuring the angle adjusting member 120 to be made of an elastic material with deformability, the antenna rotation structure 100 of the present disclosure is able to adjust the angle of the antenna 20 which is inside the housing 10 by applying external force directly to the angle adjusting member 120 from the outside of the housing 10.

In specific, the holding portion 112 of the rotating member 110 is configured to place and hold/carry the antenna 20. The pushing portion 114 is protruded from one side of the holding portion 112 toward the angle adjusting member 120. The abutting portion 124 of the angle adjusting member 120 is protruded from the pressing portion 122 toward the rotating member 110. The housing 10 further includes an upper housing 10*a* and a lower housing 10*b*. The elastic material is one of a silicon material and a rubber material, and a hardness of the elastic material is greater than or equal to 30 and less than or equal to 40 (Shore Hardness). Since the angle adjusting member 120 is made of elastic material, the housing 10 and the angle adjusting member 120 in the first embodiment can be manufactured by double injection molding, where the angle adjusting member 120 is formed by injection molding elastic material in the through hole 12 of the housing 10 after the housing 10 had been formed by injection molding, so that the angle adjusting member 120 is bonded to the through hole 12 of the housing 10. In other embodiments, the angle adjusting member can be bonded to the through hole of the housing through means of engaging, wedging, fastening, screwing, etc., and the present disclosure is not limited thereby.

More particularly, the abutting portion 124 has a cross shape. The angle adjusting member 120 can further include a supporting rib (not shown), and the supporting rib is disposed through the abutting portion 124 and is made of a rigid material. In other words, since the angle adjusting member 120 has deformation capability, disposing the supporting rib in the axis of the abutting portion 124 would help the angle adjusting member 120 to effectively push and drive the rotating member 110 to rotate while maintaining its deformability.

Figure 3:
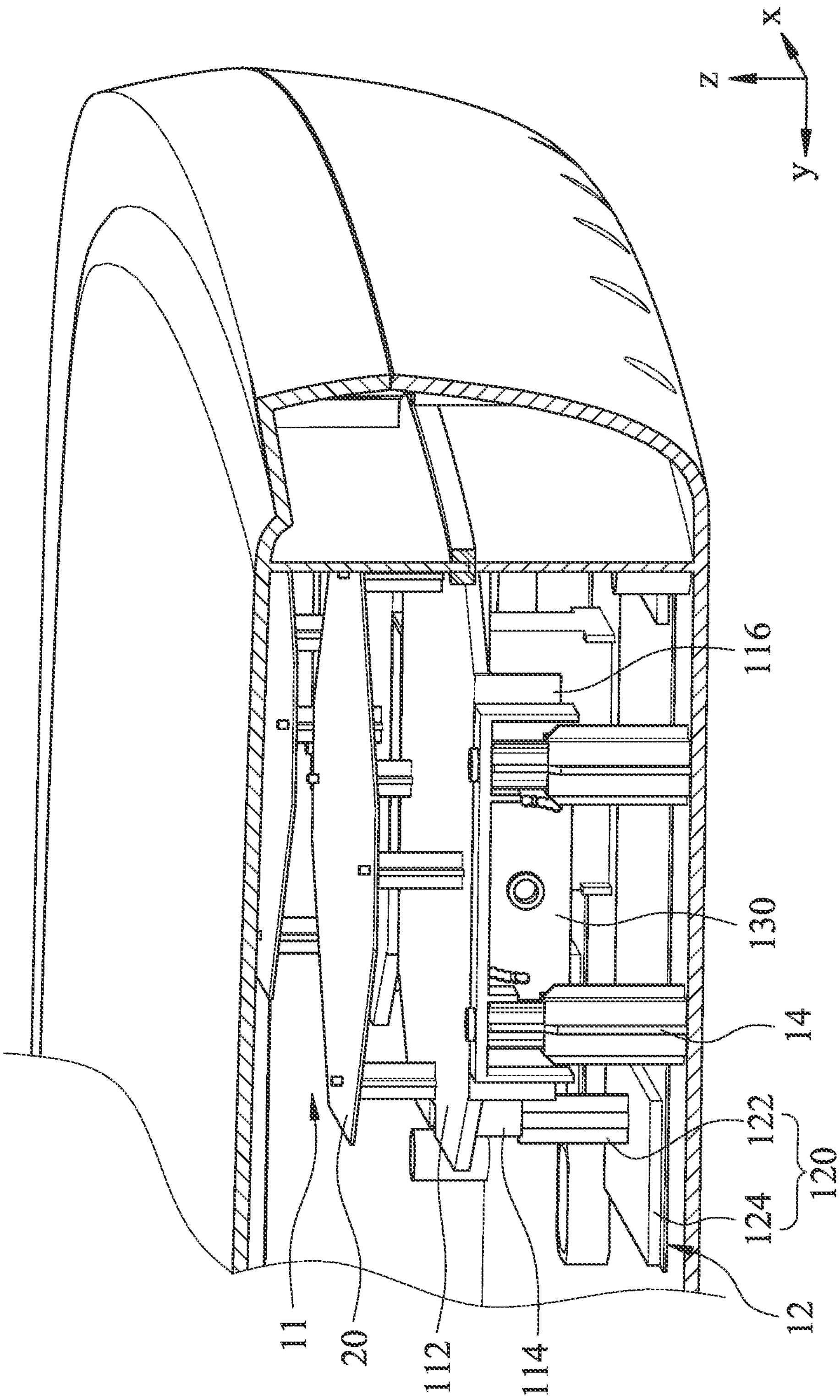
FIG. 3 is a side view of the antenna rotation structure of FIG. 1 disposed in a housing.
Figure 4:
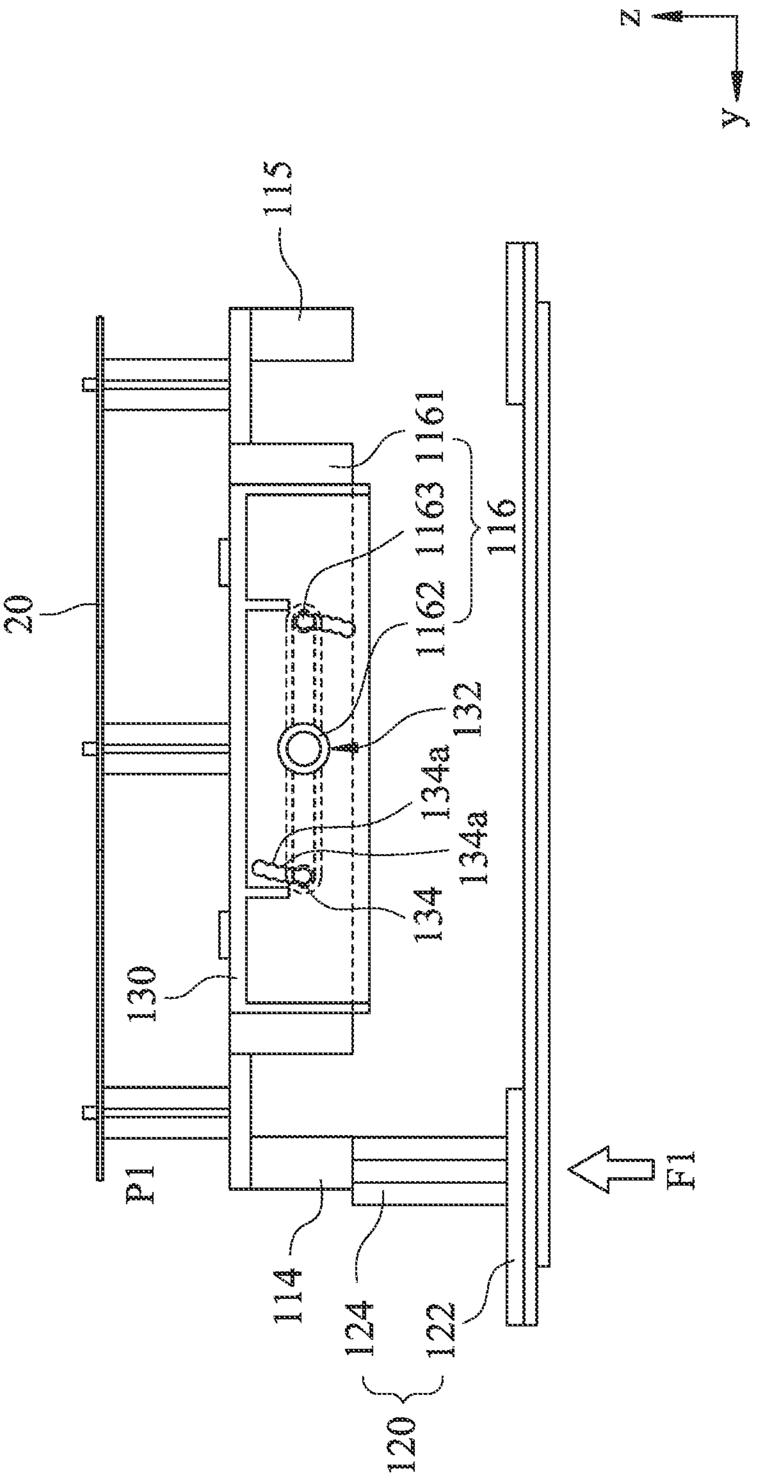
FIG. 4 is a schematic diagram illustrating the antenna rotation structure of FIG. 1 at a first position.

Referring to FIG. 1 to FIG. 4. FIG. 3 is a side view of the antenna rotation structure 100 of FIG. 1 disposed in a housing 10. FIG. 4 is a schematic diagram illustrating the antenna rotation structure 100 of FIG. 1 at a first position P1. The antenna rotation structure 100 can further include at least one fixing portion 116. The fixing portion 116 is connected to the holding portion 112 along the axial direction D and includes a board member 1161, a circular column 1162, and at least one stud 1163. The circular column 1162 is disposed at a center of the board member 1161 and is protruded from one side of the board member 1161. The stud 1163 is protruded from the one side of the board member 1161, namely, the stud 1163 is protruded from the same side of the board member 1161 as the circular column 1162. More specifically, the number of at least one stud 1163 is two, and the two studs 1163 are disposed respectively on two sides of the circular column 1162. The antenna rotation structure 100 can further include at least one angle fixing board 130. The angle fixing board 130 includes a circular hole 132 and at least one void 134. The circular hole 132 corresponds to the circular column 1162 of the fixing portion 116. The void 134 is configured to hold the stud 1163. In particular, the number of at least one void 134 is two, and each of the two voids 134 includes a plurality of restricting structures 134*a* for restricting or holding each of the two studs 1163 in place. When the studs 1163 are being restricted or held in place by different restricting structures 134*a*, different rotating angles are presented.

Figure 5:
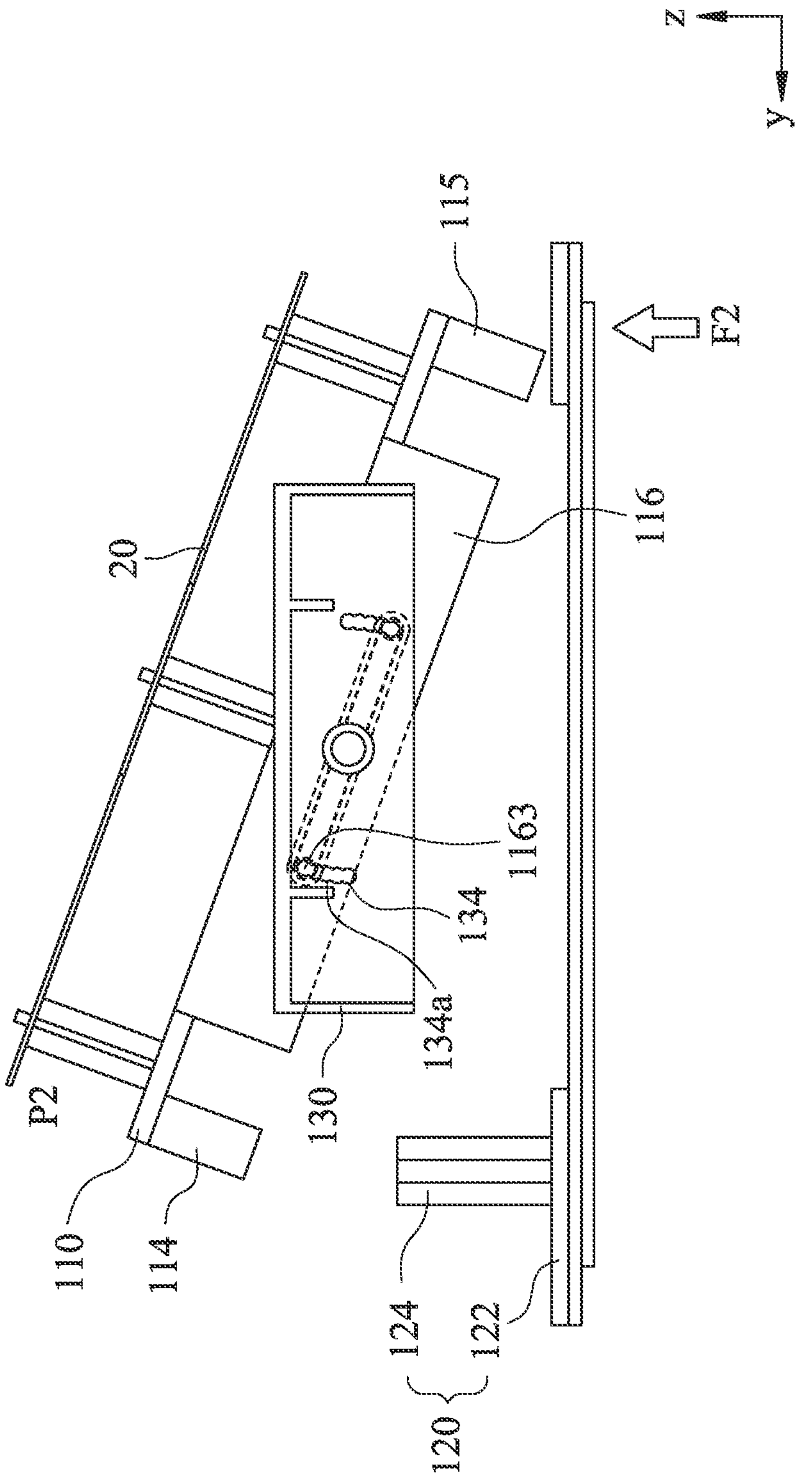
FIG. 5 is a schematic diagram illustrating the antenna rotation structure of FIG. 1 at a second position.

Referring to FIG. 4 and FIG. 5. FIG. 5 is a schematic diagram illustrating the antenna rotation structure 100 of FIG. 1 at a second position P2. The rotating member 110 can further include another pushing portion 115. The other pushing portion 115 is disposed on the other side of the holding portion 112 and corresponds to one side of the pressing portion 122, where the one side of the pressing portion 122 is away from the abutting portion 124. In other words, two pushing portions (pushing portion 114 and the other pushing portion 115) are respectively disposed on two sides of the holding portion 112 along a direction y. The rotating member 110 is movable between a first position P1 as shown in FIG. 4 and a second position P2 as shown in FIG. 5.

Furthermore, the rotating member 110 rotates, relative to the angle fixing board 130, about the axial direction D between the first position P1 and the second position P2. When the rotating member 110 is at the first position P1, the pushing portion 114 is in contact with the abutting portion 124, and the other pushing portion 115 is away from one side of the pressing portion 122. When the force F1 is applied to press on the other side of the pressing portion 122, which is the side that corresponds to the abutting portion 124, toward a direction z, the abutting portion 124 pushes the pushing portion 114 to drive the rotating member 110 to move from the first position P1 toward the second position P2, and at this time, the stud 1153 moves between the restricting structures 134*a* of the void 134. When the force F1 applied to the pressing portion 122 has ceased, the pressing portion

122 returns to the original shape and state due to elasticity, and the abutting portion 124 no longer pushes against or abuts the pushing portion 114. When the rotating member 110 is at the second position P2, the pushing portion 114 is away from the abutting portion 124, and the other pushing portion 115 is close to the one side of the pressing portion 122. When the one side of the pressing portion 122 is pressed by another force F2, it deforms and pushes the other pushing portion 115 to move the rotating member 110 from the second position P2 toward the first position P1.

Therefore, the antenna rotation structure 100 of the present disclosure adjusts the angle of the antenna 20 by pressing the deformable angle adjusting member 120 to push the rotating member 110. In comparison to the conventional antenna angle adjustment mechanism, the operating principle and the mechanism complexity are simplified, and the number of components used is reduced.

Figure 6:
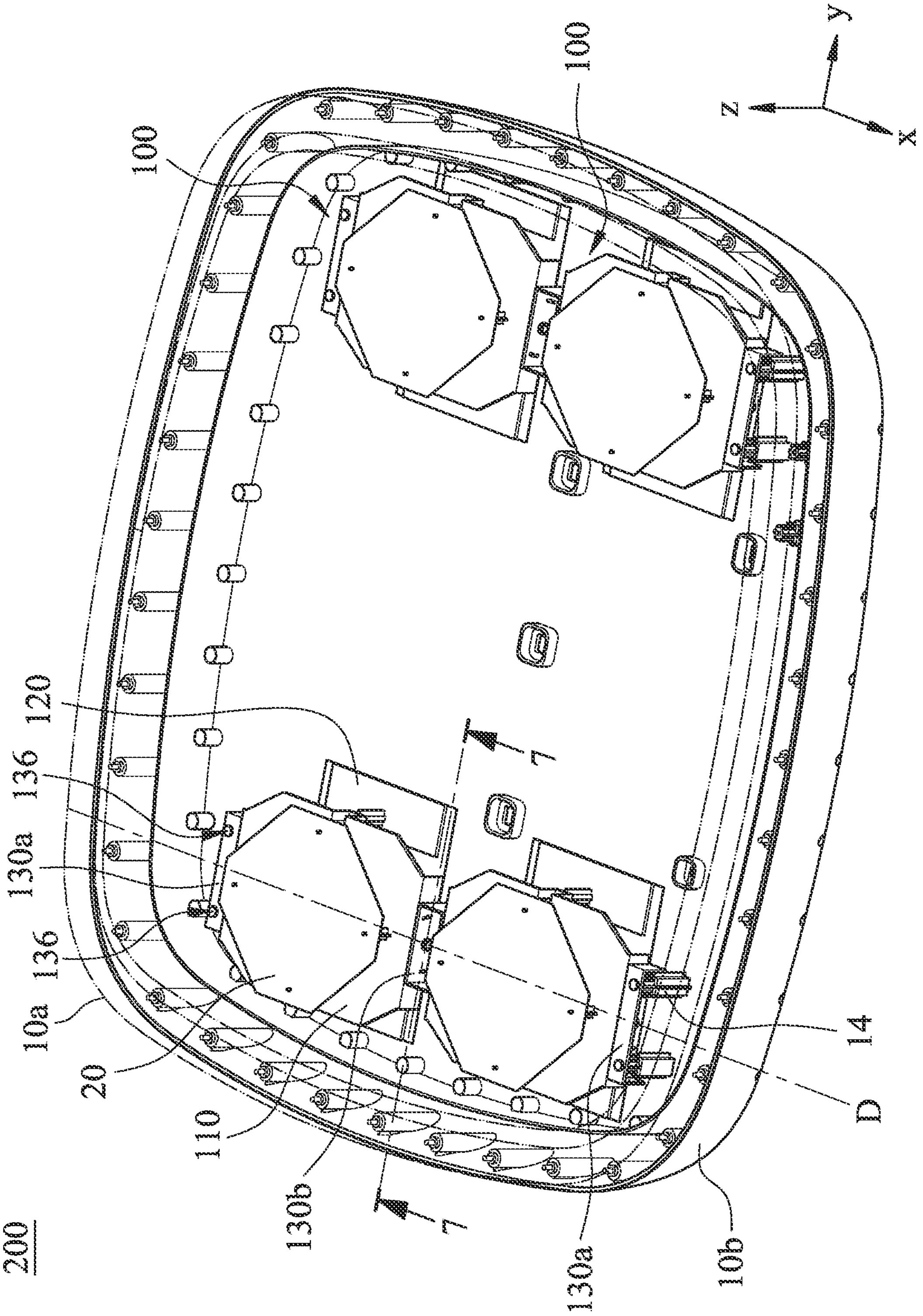
FIG. 6 is a partial perspective view of an electronic device according to a second embodiment of the present disclosure.
Figure 7:
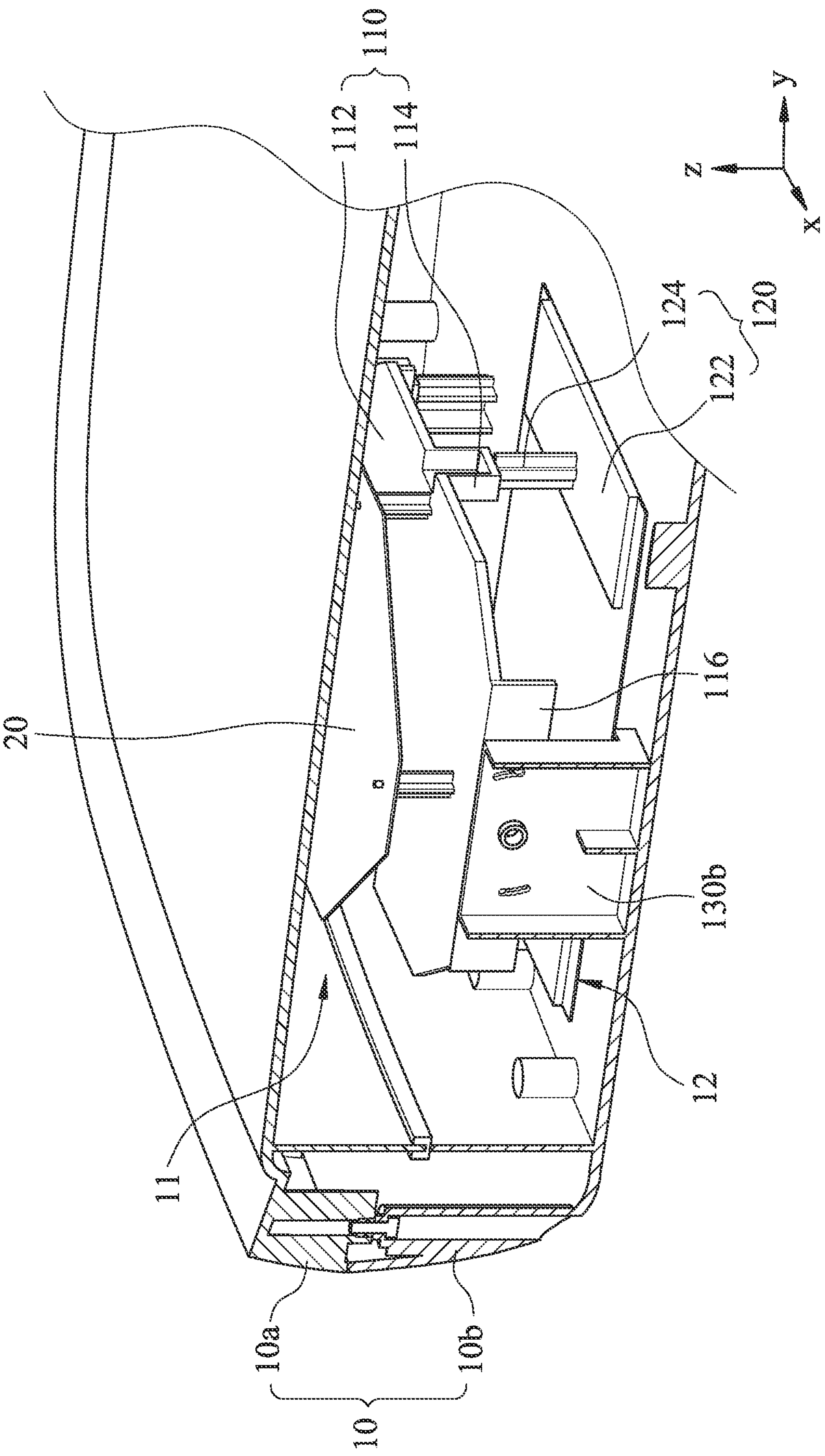
FIG. 7 is a cross-sectional view of the electronic device taken along line 7-7 of FIG. 6.

Referring to FIG. 1, FIG. 6, and FIG. 7. FIG. 6 is a partial perspective view of an electronic device 200 according to a second embodiment of the present disclosure. FIG. 7 is a cross-sectional view of the electronic device 200 taken along line 7-7 of FIG. 6. The electronic device 200 according to a second embodiment includes a housing 10, an antenna rotation structure 100, and an antenna 20. The housing 10 has an accommodating space 11 and a through hole 12. The antenna rotation structure 100 includes a rotating member 110, an angle adjusting member 120, and at least one angle fixing boards 130*a*, 130*b*. The rotating member 110 and the angle adjusting member 120 of the antenna rotation structure 100 in the second embodiment have the same structures as that of the antenna rotation structure 100 in the first embodiment and will not be described herein. The antenna 20 is disposed on the holding portion 112 of the rotating member 110.

In the second embodiment, the number of antenna rotation structure 100 in the electronic device 200 can be plural, for example, two. The adjustable angle of the antenna 20 is greater than or equal to 0 degree and less than or equal to 20 degrees. The number of at least one fixing portion 116 is two, and the number of at least one angle fixing board 130*a*, 130*b* is two, but the present disclosure is not limited thereto.

The at least one angle fixing board 130*a*, 130*b* is disposed on the housing 10. In specific, two angle fixing boards 130*a*, 130*b* respectively correspond to two fixing portions 116. The angle fixing board 130*a* is wedged or fitted to a fixing structure 14 of the housing 10 through two fixing holes 136, and the angle fixing board 130*b* is disposed upright at the bottom of the housing 10. The angle fixing boards 130*a*, 130*b* are aligned with the through hole 12 of the housing 10 in a straight light along the axial direction D, in other words, the angle fixing boards 130*a*, 130*b* are disposed respectively on two sides of the rotating member 110 along the axial direction D. In other embodiments, the angle fixing boards 130*a*, 130*b* of the antenna structure 100 can be replaced by two angle fixing boards 130*a* or two angle fixing boards 130*b*, and the present disclosure is not limited thereby.

In the electronic device 200 of the present disclosure, the antenna rotation structure 100 is placed inside the housing 10, and the angle of the antenna 20 is adjustable by pressing the pressing portion 122 of the angle adjusting member 120 from the outside of the housing 10 to deform the angle adjusting member 120 so as to push the pushing portion 114. Since the pressing portion 122 of the angle adjusting member 120 is made of elastic material with deformability, the angle adjusting member 120 remains and continues to be tight and bonded with the through hole 12 to make the inside of the housing 10 a closed space during the process of forces F1, F2 pressing the pressing portion 122. Hence, the electronic device 200 of the present disclosure is suitable for use in an environment that is underwater, wet, or outdoor.

In view of the above, the antenna rotation structure and the electronic device of the present disclosure embody the following advantages: first, by configuring the angle adjusting member of the antenna rotation structure to be made of deformable elastic material, the angle of the antenna inside the housing can be adjusted by applying external force directly to the angle adjusting member from the outside of the housing; second, the angle of the antenna can be adjusted by pressing the angle adjusting member made of deformable elastic material so as to push the rotating member, which in turn simplifies the mechanism and structural complexity of the conventional antenna angle adjustment mechanism and reduces the amount of components being used; and third, the electronic device has the antenna rotation structure disposed inside the housing and can adjust the angle of the antenna by pressing the pressing portion of the angle adjusting member from the outside of the housing, by which the angle adjusting member is deformed and pushes the pushing portion, and since the pressing portion of the angle adjusting member is made of deformable elastic material, the angle adjusting member remains and continues to be tight and bonded with the through hole during the process of external force pressing the pressing portion and a closed space is formed inside the housing, thereby rendering the electronic device suitable for use in any environment that is possible to come in contact with water.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An antenna rotation structure for adjusting an angle of an antenna from outside of a housing, the housing comprising an accommodating space and a through hole, the antenna rotation structure comprising:

- a rotating member rotatably disposed along an axial direction in the accommodating space and comprising:
  - a holding portion; and
  - a pushing portion disposed at one side of the holding portion, wherein there is an interval between the pushing portion and the axial direction; and
- an angle adjusting member comprising:
  - a pressing portion bonded to the through hole of the housing and made of an elastic material; and
  - an abutting portion connected to the pressing portion and corresponding to the pushing portion;
- wherein, when the pressing portion is pressed by a force, the pressing portion deforms and drives the abutting portion to push the pushing portion, and the pushing portion drives the holding portion to rotate about the axial direction to adjust the angle of the antenna.

2. The antenna rotation structure according to claim 1, wherein the elastic material is one of a silicon material and a rubber material, and a hardness of the elastic material is greater than or equal to 30 and less than or equal to 40.

3. The antenna rotation structure according to claim 2, wherein the angle adjusting member further comprises a supporting rib disposed through the abutting portion and made of a rigid material.

4. The antenna rotation structure according to claim 2, wherein the abutting portion comprises a cross shape.

5. The antenna rotation structure according to claim 1, wherein the rotating member further comprises:
at least one fixing portion connected to the holding portion along the axial direction and comprising:
a board member;
a circular column disposed at a center of the board member and protruding from one side of the board member; and
at least one stud protruding from the one side of the board member.

6. The antenna rotation structure according to claim 5, further comprising:
at least one angle fixing board comprising:
a circular hole corresponding to the circular column; and
at least one void configured to hold the at least one stud.

7. The antenna rotation structure according to claim 6, wherein a number of the at least one stud is two, the two studs are respectively disposed at two sides of the circular column; and a number of the at least one void is two, and each of the two voids comprises a plurality of restricting structures to hold each of the two studs in place.

8. The antenna rotation structure according to claim 1, wherein the antenna is disposed on the holding portion, and the pushing portion drives the holding portion to rotate to adjust the angle of the antenna.

9. The antenna rotation structure according to claim 1, wherein the rotating member further comprises:
another pushing portion disposed at another side of the holding portion and corresponding to one side of the pressing portion, wherein the one side of the pressing portion is away from the abutting portion;
wherein the rotating member is movable between a first position and a second position;
when the rotating member is at the first position, the pushing portion is in contact with the abutting portion, and the another pushing portion is away from the one side of the pressing portion; and
when the rotating member is at the second position, the pushing portion is away from the abutting portion, the another pushing portion is close to the one side of the pressing portion, wherein, when the one side of the pressing portion is pressed by another force, the pressing portion deforms and pushes the another pushing portion to move the rotating member from the second position toward the first position.

10. An electronic device comprising:
a housing comprising:
an accommodating space; and
a through hole;
an antenna rotation structure comprising:
a rotating member rotatably disposed along an axial direction in the accommodating space and comprising:
a holding portion; and
a pushing portion disposed at one side of the holding portion, wherein there is an interval between the pushing portion and the axial direction; and
an angle adjusting member comprising:
a pressing portion bonded to the through hole of the housing and made of an elastic material; and
an abutting portion connected to the pressing portion and corresponding to the pushing portion; and
an antenna disposed on the holding portion;
wherein, when the pressing portion is pressed by a force, the pressing portion deforms and drives the abutting portion to push the pushing portion, and the pushing portion drives the holding portion to rotate about the axial direction to adjust an angle of the antenna.

11. The electronic device according to claim 10, wherein the elastic material is one of a silicon material and a rubber material, and a hardness of the elastic material is greater than or equal to 30 and less than or equal to 40.

12. The electronic device according to claim 11, wherein the angle adjusting member further comprises a supporting rib disposed through the abutting portion and made of a rigid material.

13. The electronic device according to claim 11, wherein the abutting portion comprises a cross shape.

14. The electronic device according to claim 10, wherein the rotating member further comprises:
at least one fixing portion connected to the holding portion along the axial direction and comprising:
a board member;
a circular column disposed at a center of the board member and protruding from one side of the board member; and
at least one stud protruding from the one side of the board member.

15. The electronic device according to claim 14, wherein the antenna rotation structure further comprises:
at least one angle fixing board disposed on the housing and comprising:
a circular hole corresponding to the circular column; and
at least one void configured to hold the at least one stud.

16. The electronic device according to claim 15, wherein a number of the at least one fixing portion is two; a number of the at least one angle fixing board is two, and the two angle fixing boards correspond respectively to the two fixing portions; a number of the at least one stud of each of the two fixing portions is two, the two studs are respectively disposed at two sides of the circular column of each of the two fixing portions; and a number of the at least one void is two, and each of the two voids comprises a plurality of restricting structures to hold each of the two studs of each of the two fixing portions in place.

17. The electronic device according to claim 10, wherein the rotating member further comprises:
another pushing portion disposed at another side of the holding portion and corresponding to one side of the pressing portion, wherein the one side of the pressing portion is away from the abutting portion;
wherein the rotating member is movable between a first position and a second position;
when the rotating member is at the first position, the pushing portion is in contact with the abutting portion, and the another pushing portion is away from the one side of the pressing portion; and
when the rotating member is at the second position, the pushing portion is away from the abutting portion, the another pushing portion is close to the one side of the pressing portion, wherein when the one side of the pressing portion is pressed by another force, the pressing portion deforms and pushes the another pushing portion to move the rotating member from the second position toward the first position.

* * * * *